United States Patent
Kincs et al.

(10) Patent No.: US 6,391,369 B1
(45) Date of Patent: May 21, 2002

(54) SELECTIVELY HYDROGENATED HIGH OLEIC OIL COMPOSITIONS AND PROCESS

(75) Inventors: Frank R. Kincs, Bradley; Reynaldo G. Cruz; Robert K. Johnson, both of Bourbonnais, all of IL (US)

(73) Assignee: Bunge Foods Corporation, Bradley, IL (US)

( * ) Notice: Subject to any disclaimer, the term of this patent is extended or adjusted under 35 U.S.C. 154(b) by 0 days.

(21) Appl. No.: 08/622,953

(22) Filed: Mar. 27, 1996

(51) Int. Cl.$^7$ ............................................. A23D 9/00
(52) U.S. Cl. ........................ 426/607; 426/99; 514/141
(58) Field of Search ................. 426/607, 99; 554/141

(56) References Cited

U.S. PATENT DOCUMENTS

| | | | |
|---|---|---|---|
| 4,134,905 A | * | 1/1979 | Hasman ........................ 426/607 |
| 4,425,371 A | * | 1/1984 | Stratmann ................... 426/607 |
| 4,521,440 A | * | 6/1985 | Lansbergen ................. 426/607 |
| 4,590,087 A | * | 5/1986 | Pronk .......................... 426/607 |
| 4,627,192 A | | 12/1986 | Fick |
| 4,743,402 A | | 5/1988 | Fick |
| 5,260,077 A | | 11/1993 | Carrick et al. |

OTHER PUBLICATIONS

Bailey's Industrial Oil and Fat Products, Ed. Swern, Third Edition, Interscience Publishers, a Div. of John Wiley & Sons, New York, pp. 109 & 806.

* cited by examiner

*Primary Examiner*—Carolyn Paden
(74) *Attorney, Agent, or Firm*—Cook, Alex, McFarron, Manzo, Cummings & Mehler, Ltd.

(57) ABSTRACT

Butters are made from high oleic vegetable oils during a procedure by which a large percentage of the oleic acid is transformed into trans-configured elaidic acid, without significantly increasing the saturated fat present in the high oleic vegetable oil. The vegetable oils have an initial oleic acid content of at least about 75 weight percent, with the hard butter made from it being a high elaidic hard fat having at least about 65% trans-configured elaidic acid. The preferred process is a single-step procedure of hydrogenation in the presence of a deadened catalyst such as a sulfur-poisoned nickel catalyst.

32 Claims, 1 Drawing Sheet

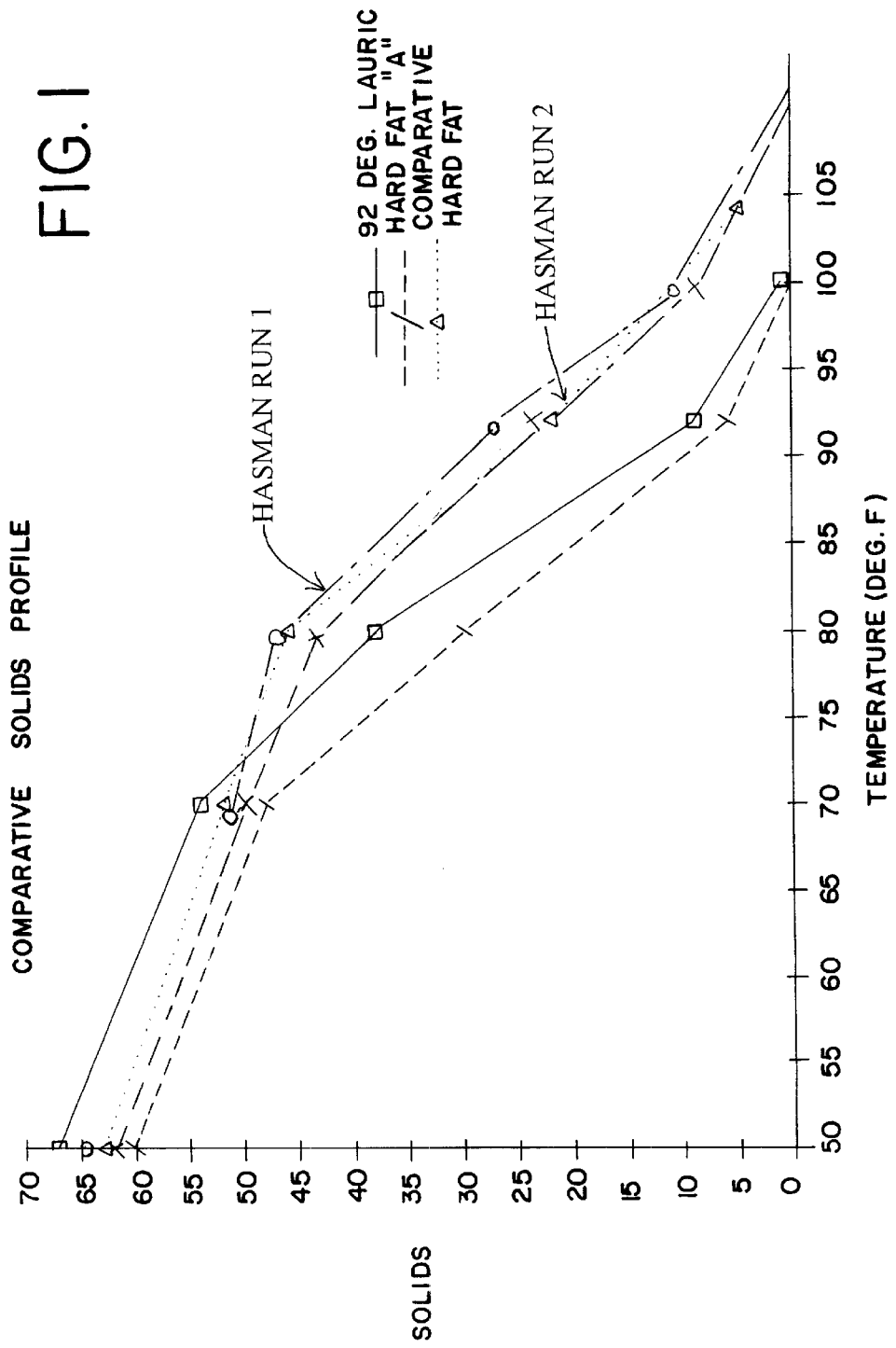

SELECTIVELY HYDROGENATED HIGH OLEIC OIL COMPOSITIONS AND PROCESS

BACKGROUND AND DESCRIPTION OF THE INVENTION

This invention generally relates to hard fats which are low in fully saturated components and which are high in trans-stereoisomer content. More particularly, the invention is directed to selectively hydrogenated high oleic oils, compositions containing these oils or fats, and a process for manufacturing same. In connection with the oleic embodiment which is described in detail herein, the selectively hydrogenated high oleic oil is an elaidinized oleic vegetable oil having a high quantity of trans-configurated elaidic acid. These are particularly suitable for incorporating into confectionery coating compositions as the hard butter component of the composition. The invention also relates to a process of direct elaidinization through the use of a deadened catalyst or catalyst blend having large percentages of deadened catalyst.

An important consideration for coating fats or hard butters for use in confectionery coatings is that they exhibit melting characteristics at which they will melt at a temperature low enough to avoid a gritty or waxy feel in the mouth while the coating is being eaten. In addition, the melting point of the fat cannot be so low as to run or bleed or melt at temperatures so low that handling is made difficult or the food becomes sticky. A hard fat having these types of desirable properties and which has been in wide use is lauric hard butter having a melting point of about 92° F., for example 92° F. hydrogenated palm kernel oil. When the confectionery coating is of a chocolate type, a traditional hard fat component is cocoa butter, which is generally an expensive component. Palm kernel oil and coconut oil have in the past gained wide use as cocoa butter substitutes because they are of a much lower cost while imparting good eating qualities. Generally, they do not exhibit a significant waxy eating quality and are quick to clear the palate, the melting temperature being approximately at or slightly below human body temperature.

Fats such as palm kernel oil and coconut oil have lost favor in recent times in large part due to their exhibiting high levels of fully saturated components. They are especially high in lauric content, a fully saturated (C-12:0) fat. In view of dietary concerns which dictate avoidance of saturated fats, other fats have been proposed and used which exhibit a lower saturated fat content.

In addition, lauric-containing hard butters exhibit an incompatibility with cocoa butter and may result in a soapy flavor. Therefore, lauric fats are not especially suitable as either partial substitutes for cocoa butter or as cocoa butter replacers. In this regard, so-called domestic hard butters, originating from soybean oil, cottonseed oil and the like, are generally used as cocoa butter replacers. Generally, these domestic hard butters require no tempering, are more stable than palm kernel or coconut oils, and generally they do not result in soapy flavor development.

Generally speaking, these domestic hard butters originate from soybean oil, cottonseed oil and the like. Such oils are subjected to various hydrogenation procedures. Many of these have advantageous steep melt profiles. Fats having steep solids profiles are desirable for confectionery coatings because they undergo a transformation from high solids content to low solids content over a relatively narrow temperature range. It is important that this temperature range be at or above room temperature and below body temperature so that the solids content will quickly decrease to near zero once the item is eaten, but not before. Some domestic hard butters do not exhibit an adequately steep solids profile. Others have a melt point temperature which is significantly above human body temperature, typically resulting in a slightly waxy eating quality and the undesirable attribute of being slow to clear the palate. Domestic hard butters having these attributes are less than desirable for use in confectionery coatings, other than those applied in very thin layers so as to minimize the impact of a waxy or gritty feel in the overall food product that is coated.

It is accordingly of interest to provide a hard butter which would have a high solids content at room temperature and above while still exhibiting a relatively low melting point at about or below body temperature while still addressing the concerns regarding hard butters that are high in saturated fats. The solid fat index (SFI) profile should also be steep so that the transformation from high solids content to very low solids content occurs over a short temperature range. Generally speaking, these properties are exhibited by 92° F. lauric hard butter, except for the fact that this hard butter is high in saturated fats.

By proceeding in accordance with the present invention, the desirable properties of a 92° F. lauric hard butter are attained in a domestic hard butter that has a very low fully saturated fat content.

The invention begins with a vegetable oil having a high oleic acid content. The high oleic oil is subjected to a hydrogenation procedure by which a vast majority of cis-stereoisomer is transformed into the trans-stereoisomer. Thus, a large proportion of the oleic content of the high oleic vegetable oil is transformed into a high elaidic content. This elaidinization of the high oleic content of the vegetable oil is carried out by subjecting the high oleic oil to hydrogenation conditions in the presence of a catalyst which is entirely deadened catalyst or has a high deadened catalyst content. By this approach, elaidinization is carried out, and the resultant hard fat has at most very low levels of fully saturated fat. The resultant hard butter is suitable to be a component in a confectionery coating composition in which this hard butter replaces the original hard butter component of the formulation while achieving the advantages discussed herein.

It is accordingly a general object of the present invention to provide an improved hard fat, confectionery coating including the hard fat, and the process for manufacturing the hard fat.

Another object of the present invention is to provide an improved product and process within which an elaidinization substantially increases the melting point of the starting vegetable oil while minimizing any development of fully saturated fats.

Another object of the present invention is to provide an improved hard fat, composition and process by which the hard fat has properties paralleling those of lauric fat without its high saturated fat profile.

Another object of the present invention is to provide an improved chocolate composition wherein a substantial portion of cocoa butter is replaced by or combined with a hard fat that is lower in cost that cocoa butter while exhibiting very low levels of saturated fat.

Another object of the present invention is to provide an improved vegetable hard butter exhibiting a steep Solids Fat Index profile and a melting point near body temperature, the SFI profile being comparable to 92° F. melting lauric hard butter.

Another object of the present invention is to provide an improved hard fat that is compatible with cocoa butter when combined in confectionery compositions.

Another object of the present invention is to provide an improved confectionery coating having a vegetable hard fat which is low in saturated fats and exhibits good eating characteristics and sufficient contraction for acceptable mold release.

These and other objects, features and advantages of the present invention will be apparent from and clearly understood through a consideration of the following detailed description.

BRIEF DESCRIPTION OF THE DRAWINGS

In the course of this description, reference will be made to the attached drawing, wherein:

FIG. 1 is a plot of solids fat indexes versus temperature of three different hard fats, one being a hard fat in accordance with the invention.

DETAILED DESCRIPTION OF THE INVENTION

Vegetable oils are processed in accordance with the present invention in order to transform them into hard fats having high levels of C-18 trans-stereoisomers. It is an important aspect of this invention that the vegetable oil which is used as the starting material in making the hard fat have an oleic acid content of at least about 75 weight percent, based upon the total weight of the vegetable oil. Preferably, the oleic acid content is at least about 80 weight percent, most preferably at least about 85 weight percent.

Furthermore, the vegetable oil starting material has a low fully saturated fat content, that is a content which is no greater than about 10 weight percent, based upon the total weight of the vegetable oil. Preferably, the vegetable oil starting material has a fully saturated C-18 or a stearic acid content of not more than about 5 weight percent, based upon the total weight of the vegetable oil. Most preferably, the total fully saturated fat content of the vegetable oil starting material is not greater than about 7 weight percent, and the stearic acid content is not greater than about 3 weight percent.

Many common domestic vegetable oils do not meet these criteria. Accordingly, it is generally preferred that the vegetable oil starting material be of an especially high oleic content type. Several such vegetable oils having oleic acid contents which are higher than common domestic oils include the following. Fick U.S. Pat. No. 4,627,192 and U.S. Pat. No. 4,743,402, incorporated by reference hereinto, disclose sunflower oils known by the trademark SIGCO of Lubrizol Corporation, Wickliffe, Ohio. These are hybrid sunflower products which have an oleic acid content of approximately 80% or more while also having a low ratio of linoleic acid to oleic acid. Other sunflower oils are also discussed in or referred to in the Fick patents. High oleic content vegetable oils are also discussed in Carrick et al U.S. Pat. No. 5,260,077, incorporated by reference hereinto, this patent requiring the incorporation of tocopherol into the vegetable oil.

A suitable high oleic content vegetable oil useful as the starting material of the present invention is a high oleic safflower oil, identified as RBD and product code 25275, available from California Oils Corporation, Richmond, Calif. The RBD high oleic safflower oil has a minimum oleic acid content of 75 weight percent. Analyses of other properties include the following: peroxide value, maximum of 0.5 ME/Kg, free fatty acids, a maximum of 0.05%, an Iodine Value of 85 to 95, a maximum moisture content of 0.05 weight percent, and a saponification value of 192.

Oil made from SUNOLA seed of Western Growers, Saskatoon, Saskatchewan is especially high in oleic acid content. High oleic sunflower oil made from such seed is known as PRO-SUN oil, Bunge Foods Corporation, Bradley, Ill. This latter sunflower oil has an oleic (C-18:1) content of 87 weight percent, a stearic (C-18:0) content of 3 weight percent, a palmitic (C-16:0) content of 3 weight percent, and a linoleic (C-18:2) content of 4 weight percent, the balance being miscellaneous oil components, all based upon the total weight of the sunflower oil composition. Prior to processing in accordance with the present invention, this high oleic sunflower oil analyzes as having 0% trans-stereoisomers. Further analysis data include the following: peroxide value, 0.2 meq/Kg, free fatty acid, 0.01%, AOM, 70 hours, and oxygen stability index (OSI) at 110° F., 22 hours.

Other hybrid vegetable oils, or vegetable oils modified by genetic engineering or other approaches for increasing oleic acid levels, can be used as the vegetable starting materials. Other exemplary vegetable oils are rapeseed oil or canola oil, soybean oil, and blends of oils having higher and lower saturated fat contents. In many instances, naturally occurring oils might not meet all of the criteria of the vegetable oil starting material according to this invention, requiring blending with large percentages of oils made by hybridization or appropriate engineering procedures.

Typically, the vegetable oil starting materials according to the invention will have an Iodine Value on the order of about 80 or above. Generally speaking, Iodine Values of this magnitude are also characteristic of the selectively hydrogenated high oleic oils in accordance with the present invention.

The selectively hydrogenated hard fats according to the present invention have exceptionally high unsaturated trans-fatty acid contents. For the high oleic oils discussed herein, the selectively hydrogenated hard fat includes substantial quantities of elaidic acid, a trans-stereoisomer of oleic acid. Ideally, all of the cis-configured oleic acid present in the vegetable oil starting material is converted or elaidinized to trans-configurated elaidic acid. Practically speaking, it is difficult to obtain full elaidinization. Generally speaking, the selectively hydrogenated hard fats according to the present invention will have an unsaturated elaidic acid (C-18:1) content of at least about 55 weight percent, preferably at least about 60 weight percent, and more preferably at least about 65 weight percent. Generally speaking, even higher values are preferred to the extent they are achievable. These weight percentages are all based upon the total weight of the hard butter.

The quantities of fully hydrogenated saturated fats present in the hard butter are substantially the same as those present in the high oleic vegetable oil starting material. Thus, the saturated fat content of the hard fat in accordance with the present invention is not greater than about 10 weight percent, preferably not greater than about 7 weight percent, with the stearic acid content being not greater than about 5 weight percent, preferably not greater than about 3 weight percent.

The total quantity of C-18:1 in the hard butter also will be about the same as present in the vegetable oil starting material, except the percentage of cis-configured oleic acid will be reduced considerably. Thus, the total C-18:1 content, the total of oleic and elaidic, is greater than about 75 weight percent, preferably greater than about 80 weight percent, most preferably greater than about 85 weight percent, an especially preferred value being equal to or greater than about 90 weight percent. All these percentages are based upon the total weight of the hard fat.

The hard fat according to the present invention has a melting point approximating human body temperature or slightly therebelow. Generally speaking, the melting point will be between about 90° and about 100° F., preferably between about 90° and about 95° F. A target value is to have a hard fat having a melting point of about 92° F.

The selectively hydrogenated hard fat or hard butter in accordance with the present invention has a steep solid fat index (SFI) profile which is comparable to that of 92° F. lauric hard butter. Accordingly, hard butters in accordance with the present invention have melting properties and SFI profiles that emulate 92° F. lauric hard butter. Examples of suitable steep SFI profiles are set out in the Table.

TABLE

| Temp (° F.) | SFI Range | SFI Hard Fat A | SFI Hard Fat B | SFI Hard Fat C |
|---|---|---|---|---|
| 50 | 60–63 | 62.5 | 60.2 | 61.8 |
| 70 | 47–50 | 48 | 47.7 | 48.5 |
| 80 | 29–32 | 30 | 29.6 | 31.8 |
| 92 | 5–7 | 6 | 5.8 | 6.7 |
| 100 | 0 | 0 | 0 | 0 |

In FIG. 1, the solids profile of hard fat "A" is plotted. It will be noted that this solids profile, which is in accordance with the present invention closely tracks the solids profile of 92° F. lauric fat, namely of hydrogenated palm kernel oil. FIG. 1 also includes a plot of a comparative hard fat. This comparative hard fat is a blend of soybean oil and cottonseed oil which had been subjected to a two-step hydrogenation. In the first step of this comparative production, the linolenic (C-18:3) and linoleic (C-18:2) acids are hydrogenated to oleic (C-18:1) acid. This first step results in a product containing approximately 72% oleic acid. In the second step the stereoisomerization to the hard fat form is achieved by a second hydrogenation. As can be seen in FIG. 1, this comparative hard fat exhibits a generally acceptable steep SFI profile; however, the higher temperature values are disadvantageous. For example, the melt point is well over 100° F. It has been found that confectionery coatings made with this comparative hard fat have a slightly waxy eating quality and are slow to clear the palate. The resulting coatings are thus limited to thin applications for products such as thin-layered coatings on snack-type cakes.

In contrast to this type of comparative hard fat, the hard butters made in accordance with the present invention are made in a single-step hydrogenation. More particularly, the high oleic vegetable oil starting materials are subjected to hydrogenation. The hydrogenation is carried out in the presence of a so-called deadened catalyst. Accordingly, the selective hydrogenation is carried out in the presence of a deadened catalyst, such as a sulfur-poisoned nickel catalyst. While relatively low percentages of "fresh catalyst" can be blended with the deadened catalyst, a catalyst that is too reactive can result in having excessive amounts of C-18:1 acid converted to fully saturated C-18:0 acid. In addition, excessively high melting points can result as well. Generally speaking, if it is desired to use a catalyst blend, it should contain not more than about 10 weight percent fresh catalyst such as a nickel catalyst which has not been sulfur poisoned.

Hydrogenation with the deadened catalyst is typically carried out for about 5 to 6 hours at a temperature of between about 320° F. to about 390° F., preferably between about 380° F. and about 390° F. During the hydrogenation, the hydrogen gas pressure of the elaidinization in accordance with the invention is typically at approximately 50 psi. With respect to the concentration of the deadened catalyst present in the high oleic vegetable oil being elaidinized, a typical range will be at least 0.1 weight percent up to a maximum of less than about 1 weight percent, based upon the total weight of the vegetable oil. A preferred range is between about 0.3 and about 0.7 weight percent.

The hard fats or hard butters of the invention are especially suitable as coating fats. Typically they have melt characteristics paralleling those of a lauric fat such as a hydrogenated palm kernel oil having a melting point of about 92° F. They will go to zero solids at just slightly above body temperature. However, unlike hydrogenated palm kernel oil, the elaidinized high oleic hard fats are much lower in saturates than palm kernel oil. Inasmuch as they are made from oils having relatively high iodine values, on the order of about 85, and inasmuch as the elaidinization procedure with the deadened catalyst leaves virtually all of the unsaturation, the hard butter has a very low saturated fat content. This latter property is relevant to various nutritional concerns. As with confectionery coating fats such as cocoa butter types, the SFI value at 50° F. is in the range of 60 solids.

With reference to the confectionery coatings made from the high elaidic hard butter, they do not require substantial modification other than incorporation of the high elaidic hard butter into the formulation in place of more traditional hard butters such as hydrogenated palm kernel oil. A typical coating formula will include between about 45 and about 55 weight percent sweetener such as sucrose, between about 25 and about 40 weight percent of the high elaidic hard butter, between about 10 and about 20 weight percent cocoa (including about 10–12 weight percent cocoa butter fat), between about 2 and about 10 weight percent non-fat dry milk, less than about 1 weight percent lecithin, combined with low levels of flavors and taste enhancers and the like. These are blended in accordance with normal processing procedures for confectionery coatings.

These coatings containing the high elaidic hard butter are suitable for enrobing various food products. They are also suitable for molding into a bar to make, for example, bar chocolate. After pouring into a mold and cooling to about 50° F., the resulting bar shrinks adequately so as to be readily removed from the mold. Also, these confectionery formulations can find use in connection with candy centers, dips and whipped toppings.

EXAMPLE 1

PRO-SUN sunflower seed oil, available from Bunge Foods Corporation, was processed into a high elaidic hard fat as follows. This high oleic oil analyzed as having the following fatty acid composition: 87 weight percent oleic (C-18:1), 4 weight percent linoleic (C-18:2), 3 weight percent stearic (C-18:0), 3 weight percent palmitic (C-16:0) and no trans-fatty acids. Its oxygen stability index at 110° F. was 22 hours, its AOM was 70 hours, its peroxide value was 0.2 meq/Kg, and it analyzed as having free fatty acids at 0.01%. Its lovibond color, red, was 1.0. This high oleic oil made from hybrid sunflower seeds was hydrogenated in the presence of 0.5% weight percent sulfur-poisoned nickel catalyst, based upon the weight of the oil. During this elaidinization procedure, the hydrogen pressure was 48 psi gauge. The reaction temperature was 385° F. The reaction proceeded for approximately 6 hours, at which time the reaction ceased.

The resulting hard fat exhibited the SFI slope or profile of Hard Fat B from the Table. Its melting point (MDP) was 92.3° F. Its iodine value was measured at 79.1, and it analyzed as having 91% elaidic acid (C-18:1) and no linoleic (C-18:2) acid. The hard fat was also analyzed as having 4.4 weight percent stearic (C-18:0) acid and 3 weight percent palmitic acid. This high oleic hard butter analyzed as having a trans-stereoisomeric content of 66 weight percent.

A coating formulation was made from the resulting high elaidic hard butter, the formulation including 32 weight percent of this hard butter. Also included was 47 weight percent sucrose, 15 weight percent cocoa (having about 11 weight percent cocoa butter), 6 weight percent non-fat dry milk, 0.4 weight percent lecithin, 0.1 weight percent salt and 0.05 weight percent vanilla. The hard butter appeared to be compatible with the cocoa butter and showed no separation. The coating formulation had sufficient contraction for mold release, and it exhibited very good eating characteristics. The melting point of the coating was lower than body temperature.

EXAMPLE 2

The procedure of Example 1 was substantially repeated. The resulting high elaidic hard butter exhibited the steep solids profile of Hard Fat C of the Table and had a melting temperature (MDP) of 92.2° F. The Iodine Value analyzed at 79.5, the fat having 90.7 of the C-18:1 acid and no C-18:2 acid. The analysis showed 3 weight percent of C-16:0 acid and 4.7 weight percent C-18:0 acid. The percent of trans-acid was 67.7 weight percent.

A coating formulation was made from this high elaidic hard butter as specified in Example 1. In addition, a cottonseed hard fat was added to the formulation at varying levels. When present at a level of about slightly greater than 1% by weight, based upon the total weight of the coating formulation, the melting point was at about body temperature (approximately 36° C.). Adding in higher quantities of the cottonseed hard fat increased the melting point and exhibited very good contraction and mold release, although levels above 10% were no longer desirable.

When 2% of the cottonseed hard fat and 5% of soy/cottonseed flakes were blended into this coating composition, it did not melt in the hand, although slight tackiness was observed.

EXAMPLE 3

The procedure of Example 1 was substantially repeated. This time, an emulsifier was added for anti-blooming reasons. More specifically, 1 weight percent of sorbitan tristearate was melted into the finished coating and mixed in thoroughly. The mixture was heated and then deposited into disk-shaped molds, cooled to about 50° F., and the thus molded disks were easily removed from the molds.

It will be understood that the embodiments of the present invention which have been described are illustrative of some of the applications of the principles of the present invention. Numerous modifications may be made by those skilled in the art without departing from the true spirit and scope of the invention.

What is claimed is:

1. A high elaidic hard butter, comprising: an elaidinized vegetable oil having an initial oleic acid content of at least about 75 weight percent, based upon the total weight of the hard butter, said hard butter having been elaidinized from cis-configured oleic acid to have at least about 65 weight percent trans-configured elaidic acid, based upon the total weight of the hard butter, said elaidinized hard butter has a melting point between about 90° F. and human body temperature and exhibits a solid fat index (SFI) profile having a steep slope approximating that of lauric fat hydrogenated palm kernel oil having a melting point of about 92° F., said elaidinized hard butter also having a fully saturated fat content of not greater than about 10% by weight, based upon the total weight of the elaidinized hard butter, and said elaidinized hard butter has an Iodine Value of at least about 75.

2. The hard butter in accordance with claim 1, wherein said hard butter includes not more than about 5 weight percent stearic acid, based upon the total weight of the hard butter.

3. The hard butter in accordance with claim 1, wherein said initial oleic acid content is at least about 80 weight percent.

4. The hard butter in accordance with claim 1, wherein said initial oleic acid content is at least about 85 weight percent.

5. The hard butter in accordance with claim 1, wherein said hard butter has a melting point of approximately 92° F.

6. The hard butter in accordance with claim 1, wherein said hard butter contains at least about 80 weight percent C-18:1 acid.

7. The hard butter in accordance with claim 1, wherein said hard butter contains at least about 85 weight percent C-18:1 acid.

8. The hard butter in accordance with claim 1, wherein said hard butter contains at least about 90 weight percent C-18:1 acid.

9. An elaidinized coating hard fat comprising an elaidinized high unsaturated C-18 vegetable oil having at least about 65% trans-configured elaidic acid, based upon the total weight of the elaidinized hard fat, said elaidinized hard fat has a melting point between about 90° F. and human body temperature and exhibits a solid fat index (SFI) profile having a steep slope approximating that of lauric fat hydrogenated palm kernel oil having a melting point of about 92° F., said elaidinized hard fat also having a fully saturated fat content of not greater than about 10% by weight, based upon the total weight of the elaidinized hard fat, and said elaidinized hard fat has an Iodine Value of at least about 75.

10. The coating hard fat in accordance with claim 9, wherein said coating fat includes at least about 90 weight percent unsaturated C-18 acid, based upon the total weight of the hard fat.

11. The coating hard fat in accordance with claim 10, wherein said C-18 acids are C-18:1 singly unsaturated acids.

12. The coating hard fat in accordance with claim 9, wherein said hard butter includes not more than about 5 weight percent stearic acid, based upon the total weight of the hard butter.

13. The coating hard fat in accordance with claim 9, wherein said hard butter has a melting point of approximately 92° F.

14. The coating hard fat in accordance with claim 9, wherein a sorbitan stearate is blended with the coating hard fat.

15. A hard fat made by the process comprising the steps of:
providing a vegetable oil having a high oleic content of at least about 75 weight percent oleic acid, based upon the total weight of the vegetable oil; and hydrogenating the high oleic acid vegetable oil in the presence of a deadened catalyst in order to elaidinize the oil to an elaidinized hard fat having a trans-configured elaidic acid content of at least about 65 weight percent, based upon the total weight of the vegetable oil, and said elaidinized hard fat has a melting point between about 90° F. and human body temperature and exhibits a solid fat index (SFI) profile having a steep slope approximating that of lauric fat hydrogenated palm kernel oil having a melting point of about 92° F., said elaidinized hard fat also having a fully saturated fat content of not greater than about 10% by weight, based upon the total weight of the elaidinized hard fat.

16. The hard fat in accordance with claim 15, wherein said hydrogenating step is a single-step procedure.

17. The hard fat in accordance with claim 16, wherein the deadened catalyst of the hydrogenating step is a sulfur-poisoned nickel catalyst.

18. The hard fat in accordance with claim 15, wherein the deadened catalyst of the hydrogenating step is a sulfur-poisoned nickel catalyst.

19. The hard fat in accordance with claim 15, wherein said hydrogenating step is carried out at between about 320 and about 390° F., and the deadened catalyst is at an amount of between about 0.1 and about 1 weight percent, based upon the weight of the vegetable oil, in the presence of hydrogen gas.

20. The hard fat in accordance with claim 19, wherein the hydrogenating step is completed in approximately 6 hours.

21. A process for making an elaidinized hard butter, comprising the steps of:

providing a vegetable oil having a high oleic content of at least about 75 weight percent oleic acid, based upon the total weight of the vegetable oil; and hydrogenating the high oleic acid vegetable oil in the presence of a deadened catalyst in order to elaidinize the oil to an elaidinized hard butter having a trans-configured elaidic acid content of at least about 65 weight percent, based upon the total weight of the vegetable oil, and said elaidinized hard butter has a melting point between about 90° F. and human body temperature and exhibits a solid fat index (SFI) profile having a steep slope approximating that of lauric fat hydrogenated palm kernel oil having a melting point of about 92° F., and said elaidinized hard butter also having a fully saturated fat content of not greater than about 10% by weight, based upon the total weight of the elaidinized hard butter.

22. The process in accordance with claim 21, wherein said hydrogenating step is a single-step procedure.

23. The process in accordance with claim 21, wherein the deadened catalyst of the hydrogenating step is a sulfur-poisoned nickel catalyst.

24. The process in accordance with claim 22, wherein the deadened catalyst of the hydrogenating step is a sulfur-poisoned nickel catalyst.

25. The process in accordance with claim 21, wherein said hydrogenating step is carried out at between about 320 and about 390° F., and the deadened catalyst is at an amount of between about 0.1 and about 1 weight percent, based upon the weight of the vegetable oil, in the presence of hydrogen gas.

26. The process in accordance with claim 25, wherein the hydrogenating step is completed in approximately 6 hours.

27. A confectionery coating composition, comprising: a sweetener, an elaidinized hard butter, a milk component, and a flavoring component, wherein said hard butter is an elaidinized high oleic vegetable oil having at least about 65% trans-configured elaidic acid, said hard butter being present in the confectionery coating composition at between about 25 and about 40 weight percent, based upon the total weight of the composition, said elaidinized hard butter has a melting point between about 90° F. and human body temperature and exhibits a solid fat index (SFI) profile having a steep slope approximating that of lauric fat hydrogenated palm kernel oil having a melting point of about 92° F., and said elaidinized hard butter also having a fully saturated fat content of not greater than about 10% by weight, based upon the total weight of the elaidinized hard butter, and said elaidinized hard butter has an Iodine Value of not less than 75.

28. The confectionery coating composition in accordance with claim 27, further including between about 10 and about 25 weight percent cocoa, based upon the total weight of the confectionery coating composition.

29. The confectionery coating composition in accordance with claim 27, wherein said hard butter has a stearic acid content of not greater than about 5 weight percent, based upon the total weight of the hard butter.

30. The confectionery coating composition in accordance with claim 27, wherein said hard butter contains at least about 80 weight percent C-18:1 acid.

31. The confectionery coating composition in accordance with claim 27, further including an anti-blooming emulsifier.

32. The confectionery coating composition in accordance with claim 27, further including up to about 10 weight percent of other hard fat components.

* * * * *

UNITED STATES PATENT AND TRADEMARK OFFICE
CERTIFICATE OF CORRECTION

PATENT NO. : 6,361,369 B1  
DATED : May 21, 2002  
INVENTOR(S) : Kincs et al.

It is certified that error appears in the above-identified patent and that said Letters Patent is hereby corrected as shown below:

<u>Title page, Item [54] and Column 1, line 2,</u>  
Title, after "OLEIC OIL" insert -- , --.

<u>Drawings,</u>  
Fig. 1, in the TEMPERATURE (DEG. F) row, after "105" insert -- 110 -- in the same amount of distance as between 100 and 105.

<u>Column 2,</u>  
Line 61, delete "cost that" and insert -- cost than --.

Signed and Sealed this

Fifth Day of November, 2002

*Attest:*

*Attesting Officer*

JAMES E. ROGAN  
*Director of the United States Patent and Trademark Office*

UNITED STATES PATENT AND TRADEMARK OFFICE
CERTIFICATE OF CORRECTION

PATENT NO. : 6,391,369 B1
DATED : May 21, 2002
INVENTOR(S) : Kincs et al.

It is certified that error appears in the above-identified patent and that said Letters Patent is hereby corrected as shown below:

<u>Title page, Item [54] and Column 1, line 2,</u>
Title, after "OLEIC OIL" insert -- , --.

<u>Drawings,</u>
Fig. 1, in the TEMPERATURE (DEG. F) row, after "105" insert -- 110 -- in the same amount of distance as between 100 and 105.

<u>Column 2,</u>
Line 61, delete "cost that" and insert -- cost than --.

Signed and Sealed this

Twenty-first Day of January, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,391,369 B1
DATED          : May 21, 2002
INVENTOR(S)    : Frank R. Kincs et al.

It is certified that error appears in the above-identified patent and that said Letters Patent is hereby corrected as shown below:

<u>Title page,</u>
Item [*] Notice, delete "0" and insert -- 1042 --.

Signed and Sealed this

Twenty-third Day of March, 2004

JON W. DUDAS
*Acting Director of the United States Patent and Trademark Office*